3,414,094
FLUID DRIVE FOR ROTARY MOWERS
Hans Hauser, Fredericktown, Ohio, assignor to The J. B. Foote Foundry Co., Fredericktown, Ohio, a corporation of Ohio
Filed Oct. 31, 1966, Ser. No. 590,937
8 Claims. (Cl. 192—3.21)

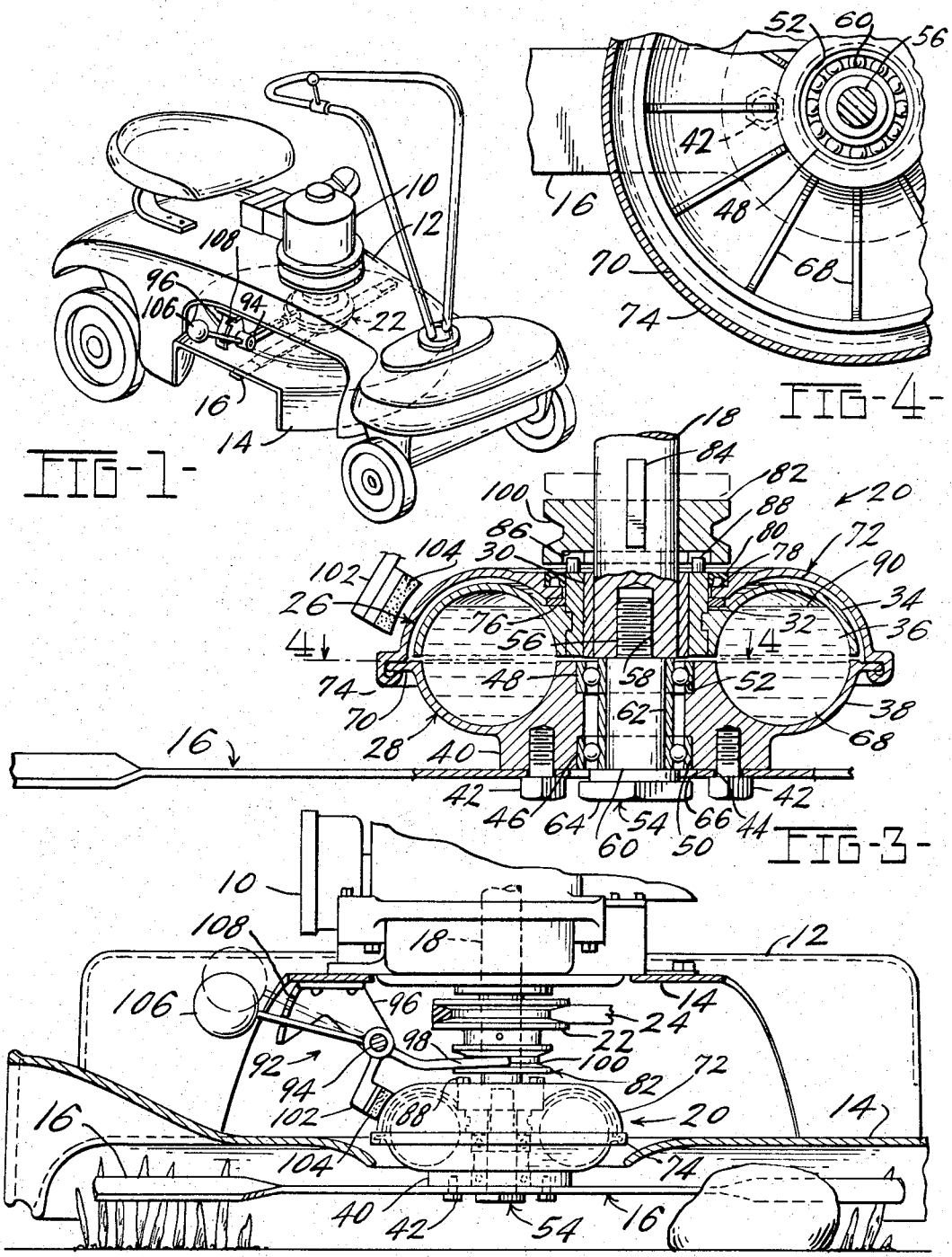

ABSTRACT OF THE DISCLOSURE

A fluid drive designed specifically for a lawn mower is provided. The drive has a unique clutch for engaging and disengaging a fluid clutch with a drive shaft and for braking the clutch housing when disengaged.

---

This invention relates to a fluid drive and more particularly to a fluid drive clutch for a rotary mower.

A drive arrangement embodying the invention is particularly suited for a rotary mower in which the mower blade is ordinarily driven directly by a driven shaft under the motor. In accordance with the invention, a fluid clutch is connected between the blade and the drive shaft of the engine, with a first part of the clutch engageable with the drive shaft and another part affixed directly to the mower blade. The invention includes a unique lever control for engaging and disengaging the first fluid clutch part with the drive shaft and for applying a brake to the second part of the fluid clutch to quickly stop rotation of the mower blade and to prevent undesirable subsequent rotation thereof.

The fluid connection between the drive shaft and the mower blade enables a relatively gradual load transfer to be achieved between the shaft and the blade so that the engine will not stall at any speed when the clutch is suddenly engaged. Also because of the gradual load transfer, the engine will not slow down and lose torque which is essential for rapid blade acceleration. The fluid clutch also provides dampening of any shock resulting from the mower blade contacting a hard, sizable object so as to reduce possible damage of the drive shaft. In addition, with the new fluid arrangement, if the engine has stalled when the mower is in deep grass, for example, there are no drive belts which will be damaged because of slipping nor will the drive arrangement tend to fade because of partial destruction of friction material used therein. The engine also can be restarted when the mower is stalled in the tall grass.

The fluid clutch includes a unique control lever arrangement by means of which the blade can be readily engaged with or disengaged from the drive shaft and, when disengaged, the control lever includes a brake which is capable of stopping the mower blade rapidly and independently of the drive shaft and of keeping the blade stationary even when the drive shaft continues to rotate.

It is, therefore, a principal object of the invention to provide an improved rotary lawn mower with a fluid drive clutch positioned directly between the engine drive shaft and the mower blade.

Another object of the invention is to provide a rotary mower with a fluid clutch and a single control for alternately engaging the blade with the drive shaft and stopping rotation of the blade.

Other objects and advantages of the invention will be apparent from the following detailed description of a preferred embodiment thereof, reference being made to the accompanying drawings, in which:

FIG. 1 is a somewhat schematic view in perspective of a riding type rotary mower embodying the invention;

FIG. 2 is an enlarged view in elevation, with parts in section, showing a portion of the engine of the mower, the mower blade, and the drive clutch embodying the invention located therebetween;

FIG. 3 is a further enlarged view in vertical cross section taken centrally through the fluid drive of FIG. 2, showing the drive shaft and the fluid clutch connecting the drive shaft and the mower blade; and FIG. 4 is a fragmentary sectional view taken along the line 4—4 of FIG. 3.

FIG. 1 shows a riding type rotary lawn mower embodying the invention. While the invention is not limited for use with a riding type lawn mower, it has been found that the drive embodying the invention is especially advantageous when used with such a mower. As shown also in FIG. 2, a suitable internal combustion engine 10 is mounted on a deck plate 12 which supports the motor 10 and can also support a shroud 14 for a mower blade 16 located therebelow. A drive shaft 18 of the engine extends below the deck 12 and is connected to the blade 16 by means of a fluid clutch indicated at 20. The drive shaft has an upper fixed pulley 22 thereon which can be connected to a transmission of the riding mower by means of a suitable V-belt 24. If the mower is not self-propelled, the pulley 22 can be eliminated.

Referring in more detail to the fluid clutch 20 in FIG. 3, the clutch has two basic parts including a rotor or first clutch portion 26, and a stator or second clutch portion 28. The rotor 26 includes a bearing sleeve 30 located around the lower end of the drive shaft 18 and around which is a hub 32 affixed to an annular rotor housing 34 having a generally semicircular cross section facing downwardly. The housing 34 has a plurality of radially extending blades 36 which also are of generally semicircular shape and have lower edges extending downwardly near the lower edge of the housing 34.

The stator 28 includes an annular lower housing 38 which, in this instance, has a relatively heavy hub portion 40 to which the mower blade 16 is affixed by two machine screws 42. The machine screws 42 extend through spaced openings 44 in the blade 16 and affix the blade directly to the hub. The hub 40 of the housing 38 is rotatably supported by the drive shaft 18 through a pair of spaced roller bearings 46 and 48 which are received in annular grooves 50 and 52 of the hub and are connected to the drive shaft 18 through a large mounting bolt 54 having a threaded shank 56 extending into a threaded passage 58 in the end of the drive shaft, and also having a larger cylindrical portion 60 on which the bearings are mounted and spaced apart by a sleeve 62. A large head 64 of the bolt extends through a central opening 66 in the rotary mower blade 16. With this arrangement, the stator 28 is supported by the drive shaft 18 but the drive shaft 18 can rotate relative thereto through the bearings 46 and 48.

The annulus of the housing 38 has dimensions similar to those of the upper housing 34 with a semicircular cross section facing upwardly. The housing also has radial blades 68 which extend close to the upper edge of the housing 38 and close to the edges of the upper blades 36, with a suitable spacing therebetween. The stator housing 38 also has an annular flange 70 extending outwardly therefrom on which is received a cover 72 having a flange portion 74 fastened around the flange 70. The cover 72 is supported primarily by the housing 38 and is maintained in spaced relationship to the housing 34 by a spacer ring 76. The cover 72 also has an inner annular groove 78 in which a resilient sealing ring 80 is located. The ring 80 is preferably of generally U-shaped cross section with an inner annular leg extending along the outer surface of the hub 32 so that oil pressure will tend to maintain the leg in sealing relation with the hub.

A jaw clutch ring 82 is located around the drive shaft 18 and rotates therewith through a pair of grooves (not shown) formed in the clutch ring 82 mating with a pair of splines 84 located on opposite sides of the drive shaft 18. The clutch ring 82 also has a plurality of radially extending grooves or engageable means 86 on the lower annular surface thereof which can engage a pair of hardened teeth or engaging means 88 located on the upper annular surface of the hub 32. With this arrangement, when the clutch ring 82 is moved into engagement with the teeth 88, the hub 32 is connected with the drive shaft 18 through the clutch ring 82 and rotates therewith. The rotor housing 34, affixed to the hub 32, then rotates with the hub. When the rotor housing 34 begins to rotate, oil or other suitable liquid, the upper level of which is designated 90 in the housing, then causes the blades 68 in the lower stator housing 38 to begin to rotate and thereby rotate the stator housing 38 along with its hub 40 and the mower blade 16. The housings and most of the other components are made of aluminum so as to have little mass and, consequently, enable rapid acceleration of the blade 16.

When the clutch ring 82 is in an upper position and out of engagement with the teeth 88, the rotor housing 34 will tend to remain stationary relative to the drive shaft 18 through the sleeve bearing 30. The lower, stator housing 38 also will tend to remain stationary, with the bolt 54 and the inner races of the lower bearings 46 and 48 rotating with the drive shaft 18. Because there will be a certain amount of friction in the roller bearings 46 and 48 and because there will also be a certain amount of friction associated with the sleeve bearing 30, there will be a tendency for the blade 16 to rotate with the drive shaft 18 even when disengaged which, if unrestricted, can result in relatively rapid rotation of the mower blade.

In accordance with the invention, a single control lever 92 can control engagement and disengagement of the fluid clutch and also control rotation of the blade 16. The control lever 92 can be pivotally supported by the mower. in the specific form shown, by an axle 94 and a bracket 96 attached to the lower surface of the deck 12. The lever 92 has a forked or bifurcated leg or end 98 which is received in a groove 100 of the jaw clutch 82 and is effective to move the clutch 82 vertically when the lever 92 is pivoted. When the jaw clutch is moved downwardly, as noted before, the teeth 88 are received in the radial grooves or recesses 86 in the clutch 82 to effect a mechanical connection between the hub member 32 and the shaft 18. Also, when the clutch 82 is raised by the lever 92, the shaft 18 rotates relative to the bearing sleeve 30 and the hub 44 so that the upper and lower fluid clutch portions 26 and 28 can remain stationary relative to the shaft 18. Because of a certain amount of friction between the shaft and the clutch portions, however, the control lever 92 is provided with a brake arm 102 and a brake shoe 104 which move toward and away from the cover 72 when a brake lever handle 106 is lowered and raised by an operator.

With this arrangement, when the jaw clutch 82 is raised and the shaft and clutch portions are disengaged, the brake shoe 104 is automatically brought into engagement with the cover 72 to provide resistance sufficient to maintain the blade 16 stationary. Also, with this arrangement, if it is desired to stop the blade 16 quickly, the handle 106 can be moved downwardly rapidly to disengage clutch and immediately stop rotation of the blade through the brake even though the upper clutch portion 26 may tend to continue rotating under inertia. As shown in FIG. 1, the brake lever 92 can extend beyond one side of the deck 12 and be held in the engaged and disengaged positions by suitable notches 108 formed in the bracket 96.

Various modifications of the above described embodiment of the invention will be apparent to those skilled in the art, and it is to be understood that such modifications can be made without departing from the scope of the invention, if they are within the spirit and the tenor of the accompanying claims.

I claim:

1. A drive for connecting a drive shaft and a mower blade of a rotary mower comprising a fluid clutch including a first clutch portion engageable with the drive shaft and a second clutch portion adapted to be connected with the rotary mower blade, clutch means for engaging with disengaging said first clutch portion with the drive shaft, a lever having a portion engageable with said clutch means to move said clutch means into engagement with said first clutch portion when in one position and out of engagement with said first clutch portion when in a second position, said lever having brake means positioned to move into engagement with said second clutch portion when said clutch means is disengaged and to move out of engagement with said second clutch portion when said clutch means is engaged, said clutch means comprising a clutch ring rotatable with the drive shaft but movable longitudinally thereof toward and away from said first clutch portion, and said lever includes means at a portion thereof engageable with said clutch ring to move said clutch ring into and out of engagement with said first clutch portion.

2. A drive according to claim 1 characterized by said brake means including a brake arm and a brake shoe spaced from said lever portion.

3. A drive according to claim 2 further characterized by a bracket adapted to be supported by the mower and pivotally connected to said lever to enable pivotal movement of said lever, said bracket having means cooperating with said lever to aid in maintaining said lever in engaged and disengaged positions.

4. A fluid clutch for connecting a drive shaft to a driven member comprising a first clutch portion having a hub around said drive shaft and rotatable relative thereto and an annular housing around said hub, said annular housing having a plurality of outwardly extending blades therein, said fluid clutch further comprising a second portion having bearing means around said drive shaft and an annular housing around said bearing means facing said first housing, said second annular housing also having a plurality of blades therein cooperating with said first blades to cause said second clutch portion to rotate when said first clutch portion is rotated, said hub having engaging means extending therefrom, jaw clutch means associated with said drive shaft, means connecting said jaw clutch means and said drive shaft to enable said jaw clutch means to rotate with said drive shaft but to move longitudinally with respect thereto, said jaw clutch means having engageable means to receive said engaging means when said jaw clutch means is moved toward said hub, and means associated with said jaw clutch means to enable an operator to move said jaw clutch means into and out of engagement with said hub.

5. A fluid clutch according to claim 4 wherein said jaw clutch moving means comprises a lever pivotally carried by a mower and extending away from said jaw clutch means, said lever having an end engageable with said jaw clutch means to move said jaw clutch means toward and away from said hub.

6. A clutch according to claim 5 further characterized by said lever having a brake extending therefrom and engageable with said second clutch portion when said lever disengages said jaw clutch means from said first clutch portion.

7. A fluid clutch for connecting a drive shaft to a driven member comprising a first clutch portion having a hub around said drive shaft and rotatable relative thereto and an annular housing around said hub, said annular housing having a plurality of outwardly extending blades therein, said fluid clutch further comprising a second portion having bearing means around said drive shaft and a second annular housing around said bearing means facing said first housing, said second annular housing also having a plurality of blades therein cooperating with said first blades to cause said second clutch portion to rotate when said first clutch portion is rotated, said second clutch portion further having a cover affixed to the periphery of said second annular housing and extending upwardly around said first annular housing to form a cover for said fluid clutch, sealing means between said cover and said first clutch portion to prevent the escape of fluid therefrom, clutch means for connecting and disconnecting said drive shaft and said first clutch portion and comprising a clutch ring rotatable with the drive shaft but movable longitudinally thereof toward and away from said first clutch portion, and a lever having means at an end engageable with said clutch ring to move said clutch ring into and out of engagement with said first clutch portion.

8. A fluid clutch connecting a vertical drive shaft to a driven member, a shroud covering said driven member, said clutch comprising a first clutch portion having a hub around said drive shaft and rotatable relative thereto and an annular housing around said hub having a plurality of outwardly extending blades therein, said fluid clutch further comprising a second clutch portion having bearing means supported by said drive shaft and a second annular housing around said bearing means facing said first housing to define a fluid chamber, said second housing also having a plurality of blades therein cooperating with the first blades to cause the second clutch portion to rotate when said first clutch portion is rotated, said second housing having a central hub portion around said bearing means, means fastening a central portion of said driven member directly to said central hub portion, a clutch for connecting said drive shaft and said first clutch portion, a lever mounted on said shroud, said lever having means at an end portion thereof engageable with said clutch to move said clutch, said lever having a brake arm and a brake shoe spaced from said lever end and engageable with said first housing when said clutch disengages said drive shaft and said first clutch portion, said lever further having a handle extending beyond said shroud to be accessible for manual operation.

References Cited
UNITED STATES PATENTS

| | | | |
|---|---|---|---|
| 2,104,608 | 1/1938 | Cox et al. | |
| 2,671,543 | 3/1954 | Bosch. | |
| 2,699,682 | 1/1955 | Castner | 192—3.21 X |
| 2,723,737 | 11/1955 | Hammell et al. | 192—3.24 X |
| 2,985,992 | 5/1961 | Dowdle | 56—25.4 |
| 3,026,665 | 4/1962 | Hoff | 56—25.4 |

BENJAMIN W. WYCHE III, *Primary Examiner.*

UNITED STATES PATENT OFFICE
CERTIFICATE OF CORRECTION

Patent No. 3,414,094                            December 3, 1968

Hans Hauser

It is certified that error appears in the above identified patent and that said Letters Patent are hereby corrected as shown below:

Column 1, line 22, "driven" should read -- drive --. Column 3, line 64, after "disengage" insert -- the --. Column 4, line 8, "with" should read -- and --.

Signed and sealed this 17th day of March 1970.

(SEAL)
Attest:

Edward M. Fletcher, Jr.                        WILLIAM E. SCHUYLER, JR.
Attesting Officer                                     Commissioner of Patents